United States Patent
Tatsuura et al.

(10) Patent No.: US 6,806,996 B2
(45) Date of Patent: Oct. 19, 2004

(54) OPTICAL SWITCHING SYSTEM

(75) Inventors: Satoshi Tatsuura, Ashigarakami-gun (JP); Makoto Furuki, Ashigarakami-gun (JP); Izumi Iwasa, Ashigarakami-gun (JP); Yasuhiro Sato, Ashigarakami-gun (JP); Minquan Tian, Ashigarakami-gun (JP); Lyong Sun Pu, Suwon (KR)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/621,605

(22) Filed: Jul. 18, 2003

(65) Prior Publication Data

US 2004/0051933 A1 Mar. 18, 2004

(30) Foreign Application Priority Data

Aug. 22, 2002 (JP) ........................ 2002-241820

(51) Int. Cl.[7] .......................... G02B 26/08; G02B 6/06; G02F 1/29
(52) U.S. Cl. .................... 359/298; 359/299; 385/16
(58) Field of Search .................. 359/290, 580, 359/245–246, 248, 298, 299; 385/14, 1–3, 5, 16

(56) References Cited

U.S. PATENT DOCUMENTS 6,384,960 B1 * 5/2002 Andrieux et al. ............ 359/299

2002/0176650 A1 * 11/2002 Zhao et al. .................... 385/16

FOREIGN PATENT DOCUMENTS

JP          A 11-15031       1/1999
WO    WO 03/034142 A1    4/2003

OTHER PUBLICATIONS

Zujin Shi et al., Chemical Communication, The Royal Society of Chemistry 2000, "Single–Wall Carbon Nanotube Colloids in Polar Solvents", Mar. 2, 2000, pp. 461–462.

Xuchun Liu et al. Applied Physics Letters, "Third–Order Optical Nonlinearity of the Carbon Nanotubes", Jan. 11, 1999, vol. 74, Num. 2, pp. 164–166.

H. Katawara et al. Synthetic Metals 103 (1999), "Optical Properties of Single–Wall Carbon Nanotubes", pp. 255–2558.

* cited by examiner

Primary Examiner—Hung Xuan Dang
Assistant Examiner—Joseph Martinez
(74) Attorney, Agent, or Firm—Oliff & Berridge, PLC

(57) ABSTRACT

Provided is an optical switching system which is capable of being operated at a very high speed in a communication wavelength region and of meeting the various requests at a high grade by the provision of an optical switching system having such a construction that a signal light composed of a light pulse train, and a pulse-like control light synchronous therewith are applied to a light control portion composed of a thin film made of carbon nanotubes to selectively transmit the light pulse train in the signal light through the thin film to form an output signal light and then receiving the output signal light thus formed is received.

16 Claims, 9 Drawing Sheets

ABSORPTION SPECTRUM AND REFRACTIVE INDEX DSPERSION CURVE OF CARBON NANOTUBE THIN FILM

ABSORPTION SPECTRUM AND REFRACTIVE INDEX DSPERSION CURVE OF CARBON NANOTUBE THIN FILM

TIME RESPONSE CHARACTERISTICS OF ABSORPTION CHANGE IN CARB NANOTUBE THIN FILM

FITTING RESULTS OF TIME RESPONSE CHARACTERISTICS OF CARBON NANOTUBE THIN FILM

OPTICAL SWITCHING SYSTEM

FIELD OF THE INVENTION AND RELATED ART STATEMENT

The present invention relates in general to an optical switching system which is capable of distributing and controlling a signal light composed of light pulses in a communication wavelength band with a pulse-like control light. In particular, the invention relates to an optical switching system utilizing characteristics of an absorption change of a light which a carbon nanotube has.

A carbon nanotube (CNT) is a tubular carbon crystal into which a graphene sheet is rounded, and may take any state from metal to semiconductor depending on a rounding state of the graphene sheet. The carbon nanotubes are classified into a single wall carbon nanotube (SWNT) composed of a graphene sheet of a single layer, and a multi-wall carbon nanotube (MWNT) in which graphene sheets are made into a multi-layer structure. These carbon nanotubes are being studied as a material for a fuel cell, a hydrogen occulusion, a field emission source or the like in the various fields due to a unique property thereof (refer to an article of "The Foundation of Carbon Nanotube", by Yahachi Saitoh and Shunji Bandoh, CORONA PUBLISHING CO., LTD., 1998, or the like). However, the study for carbon nanotubes till now mainly aims at the application to electric and electronic materials, and hence it may not safely be said that they have been sufficiently examined for optical application.

In case of the optical application, an access to a single carbon nanotube with a fine probe as in case of the application to electric and electronic devices is difficult to be made. Hence, an access to an aggregate of a carbon nanotube with a beam condensed so as to have a diameter of several hundreds nm to several tens $\mu$m is chiefly carried out. As the chief reasons that the examination for the optical application gets behind the examination for the application to the electric and electronic materials, it is conceivable that it is difficult to obtain highly pure carbon nanotube samples, especially, SWNT samples, in a scale required for the optical evaluation, and any of carbon nanotubes is difficult to be dissolved into solvent so that it is difficult to obtain an optically uniform films, and so forth.

With respect to the optical applications, the SWNT which has a single absorption band, and which is advantageous in comparison of the optical characteristics thereof with calculated values is chiefly being examined. In an example in which non-linear optical constants of the SWNT in a state of being dispersed in solution are evaluated in 1,064 nm, 532 nm and 820 nm as a non-resonance region, such large linearity as to expect the practicability has not yet been reported (refer to an article of X. Liu et al.: Applied Physics Letters, 74(1999), pp. 164 to 166; Z. Shi et al.: Chemical Communications, (2000), pp. 461 to 462).

On the other hand, the calculation result reveals that the SWNT has an absorption band in the range of 1.2 to 1.6 $\mu$m as a communication wavelength region depending on a diameter of a tube (refer to an article of H. Kataura et al.: Synth. Met., 103(1999). pp. 2555 to 2558). In addition, it is reported that a tube diameter can be controlled by a temperature in manufacturing the SWNT (refer to an article of O. Jost et al.: Applied Physics Letters, 75(1999), pp. 2217 to 2219). These results suggest the possibility that the resonance effect of the SWNT can be utilized in the communication wavelength region.

We, on the basis of the foregoing notion, made examination with respect to the non-linear optical effect under the condition of the resonance in the communication wavelength region of the SWNT. As a result, we found out that an SWNT thin film shows absorption saturation of high efficiency in that wavelength region, and by utilizing this phenomenon have completed optical elements, each using an SWNT thin film, each of which is operated in the communication wavelength region (refer to Japanese Patent Application No. 2001-320383).

The optical elements thus found out are an optical switch, a saturable absorption mirror, a waveform shaping unit and the like each of which utilizes high efficient absorption saturation in the communication wavelength region of the SWNT. Though these elements provide non-linear optical elements which are respectively low in cost and can be operated at high efficiency, the performance evaluation thereof is carried out only with respect to the static performance such as driving energy, and hence the dynamic performance such as time response characteristics for a control light has not yet been evaluated.

For constructing an optical switching system which can be operated in the communication wavelength region and at a very high speed, it is necessary to evaluate the dynamic performance, more specifically, the time response characteristics for a control light. That is to say, for constructing a very high speed optical switching system using the carbon nanotubes, it is required that a speed of recovery of an absorption change induced by application of the control light is sufficiently high (a time constant of recovery of absorption saturation is very small). Hence, in a stage in which there is found out the above-mentioned optical elements which are not yet evaluated with the dynamic performance thereof, the construction of an optical switching system which can be operated at a very high speed belongs to an unknown province.

The characteristics required for an optical switching system, in addition to high efficiency and high speed response as described above, are excellent processability, high productivity, a low cost, possibility of promotion of an increased area, a high S/N ratio and the like. Hence, there has been desired a material meeting these characteristics at a high grade.

SUMMARY OF THE INVENTION

In the light of the foregoing, the present invention has been made in order to solve the above-mentioned problems associated with the prior art, and provides an optical switching system which is capable of being operated at a very high speed in a communication wavelength region and of meeting the various requests at a high grade under a condition in which carbon nanotubes are submitted for the optical applications.

The present inventors made evaluation of the dynamic performance of a thin film made of carbon nanotubes (hereinafter referred to as "a carbon nanotube thin film" for short when applicable), more specifically, the time response characteristics of an absorption change of the carbon nanotube thin film in the communication wavelength region. As a result, we confirmed that the absorption change induced by application of a control light recovers at a very high speed within a period of time of 1 ps (ps=$10^{-12}$ sec). Then, we have completed an optical switching system which has a novel construction using a thin film made of carbon nanotubes, and which can be operated at a very high speed on the basis of the important knowledge concerning the function of the thin film made of the carbon nanotubes.

That is to say, according to the present invention, there is provided an optical switching system including: a light control portion to be irradiated with a signal light composed of a light pulse train; a control light applying unit that applies a pulse-like control light synchronized with the signal light to the light control portion to selectively transmit a light pulse train within the signal light to form an output signal light; a clock extracting unit that synchronizes the control light applied by the control light applying unit with the signal light; and a signal detecting unit that receives the output signal light, in which the light control portion is composed of a thin film made of carbon nanotubes.

According to the present invention, the light control portion is composed of a thin film made of carbon nanotubes and hence an absorption change induced by application of the control light recovers at a very high speed. Thus, a pulse-like light is used for each of the signal light and the control light, whereby a signal light pulse train having a very high repetitive frequency can be processed by applying the control light synchronous with the signal light pulse train to the light control portion by the control light applying unit. As a result, an optical switching system is realized which can be operated at a very high speed.

In the optical switching system of the present invention, the light control portion is composed of the thin film in which carbon nanotubes which can be formed by application are heaped. Hence, the optical switching system is excellent in processability, high in productivity, and low in cost, and also promotion of an increased areas is possible therefor.

In the optical switching system of the present invention, it is possible to process the above-mentioned signal light, more specifically, the signal light pulse train having a high repetitive frequency on the order of $10^9$ to $10^{12}$ pulses/sec.

In the optical switching system of the present invention, the repetitive frequency of the control light can be made equal to or lower than $1/10$ of the repetitive frequency of the signal light. The optical switching system is constructed so that plural signal light pulses are controlled with one control light pulse, whereby the signal light can be controlled with the control light having a low repetitive frequency. Consequently, the control for a light pulse can be carried out at a very high speed.

In the optical switching system of the present invention, each of the signal light and the control light can be composed of a light pulse with a time width on the order of $10^{-12}$ to $10^{-15}$ sec.

In the optical switching system of the present invention, the thin film made of carbon nanotubes preferably contains a single wall carbon nanotube in which absorption saturation is induced at high efficiency. The thin film contains a single wall carbon nanotube, whereby an absorption wavelength region can be made to fall within the range of 1.2 to 1.6 $\mu$m, and hence the signal light control in the communication wavelength region can be carried out.

In addition, since the absorption wavelength region is satisfactorily set in the above-mentioned range with a carbon nanotube a diameter of which is in the range of 0.8 to 1.3 nm, it is preferable to contain a carbon nanotube having such a range.

The thin film can be formed by spray-applying dispersion liquid having a carbon nanotube dispersed in a dispersion medium. Since the thin film can be thus formed in a simple manner by the application, the optical switching system is excellent in processability, high in productivity, and is low in cost, and more over, the promotion of an increased area is readily carried out therefor.

At this time, as for the dispersion medium, for example, dimethylformamide can be used.

A thickness of the thin film is preferably in the range of 100 to 600 nm.

In the optical switching system of the present invention, a first condensing unit that condenses the signal light to be applied to the light control portion on an irradiation surface of the light control portion is preferably arranged in a path along which the signal light travels. By thus condensing the signal light to be applied to the light control portion to increase an intensity thereof, it is possible to enhance the throughput of the signal light in the light control portion.

In the optical switching system of the present invention, a second condensing unit that condenses the control light to be applied to the light control portion on an irradiation surface of the light control portion is preferably arranged in a path along which the control light travels. For the control light applied to the light control portion, the light having a high intensity to some extent is required for the purpose of inducing the absorption saturation of a light. Then, since the control light to be applied to the light control portion is condensed in such a manner to allow the intensity to be increased, the control light applied from the control light applying unit can be suppressed all the more to allow the energy efficiency to be enhanced.

At this time, a diameter of a spot of the signal light condensed by the first condensing portion and/or the control light condensed by the second condensing portion on the irradiation surface of the light control portion is preferably in the range of 10 to 200 $\mu$m.

In the optical switching system of the present invention, it is preferable that the irradiation surface of the light control portion be divided into plural areas, and the individual areas obtained through the division be optically controlled independently and in parallel. If the irradiation surface of the light control portion is divided into plural areas, and the light control is carried out in such a manner, then light pulses of a large quantity of signal light can be controlled at a time on one surface to make a very high speed operation possible. Note that, "division into areas" in the present invention does not mean the physical division, but means the division into areas for which optical switching functions function independently of one another. Thus, the division concerned becomes seemingly the virtual division. Of course, the physical division may also be available.

In particular, if a construction is adopted in which light pulses of plural signal lights are controlled independently and in parallel for the respective areas which are obtained by dividing the irradiation surface of the light control portion with a light pulse of one control light, then the repetitive frequency of the control light can be lowered (the repetitive frequency of the control light, for example, can be made equal to or smaller than $1/10$ of that of the signal light) to allow a signal light having a very high repetitive frequency to be controlled.

As for the optical switching system having such a construction, there is given one having a construction including a parallelizing unit that enlarges the signal light to be applied to the light control portion so as cover the entire plural areas obtained through the division and converts the resultant light into parallel signal lights, in which the control light applied from the control light applying unit is applied to the light control portion so as to have such spreading within a surface perpendicular to a travelling direction (and so as to make a predetermined angle with the parallel signal light if necessary) as to cover the entire plural areas obtained through the division.

As described above, according to the optical switching system of the present invention, it is possible to carry out light pick-up and light distribution of a highly repetitive signal light in accordance with the control light.

Note that, very recently, a paper concerned with the light response characteristics of the carbon nanotube in which the phenomenon similar to the high speed response characteristics of the carbon nanotube in the present invention is described was reported and at the same time, U.S. Patent Application thereof was filed with the Patent Office (refer to an article of Y.-C. Chen et al.: Applied Physics Letters, 81(2002), pp. 975 to 977; and U.S. patent application (Ser. No.: 10/074,937) by Y. P. Zhao et al. filed on Feb. 12, 2002).

However, though the technique in the above-mentioned article in which the carbon nanotube thin film is described aims at a very high speed optical switch in 1.55 μm as the communication wavelength region, since the absorption lies in 2.1 μm to be out of the resonance, the non-linear optical performance is limited to about 1/1,000 of a maximum value of the carbon nanotube thin film in the present invention. In addition, in the first place, the carbon nanotube thin film described in the above-mentioned article is a film which is formed by dispersing carbon nanotubes in polymer. Thus, an absorption coefficient thereof in 1.55 μm is also so small as to be about 1/100 of that of the carbon nanotube thin film in the present invention, and hence the application of the carbon nanotube concerned to a vertical incidence type optical switch as will be shown in the later embodiments is accompanied with difficulty.

From the foregoing, it can be said that the present invention is different in constitution from the carbon nanotube thin film and the optical switch using the same described in the above-mentioned article, and hence can provide a very high speed optical switch having higher efficiency than that of the optical switch described in the article.

BRIEF DESCRIPTION OF THE DRAWINGS

Preferred embodiments of the present invention will be described in detail based on the following figures, wherein.

DETAILED DESCRIPTION OF THE PREFERRED EMBODIMENT

Figure 1:
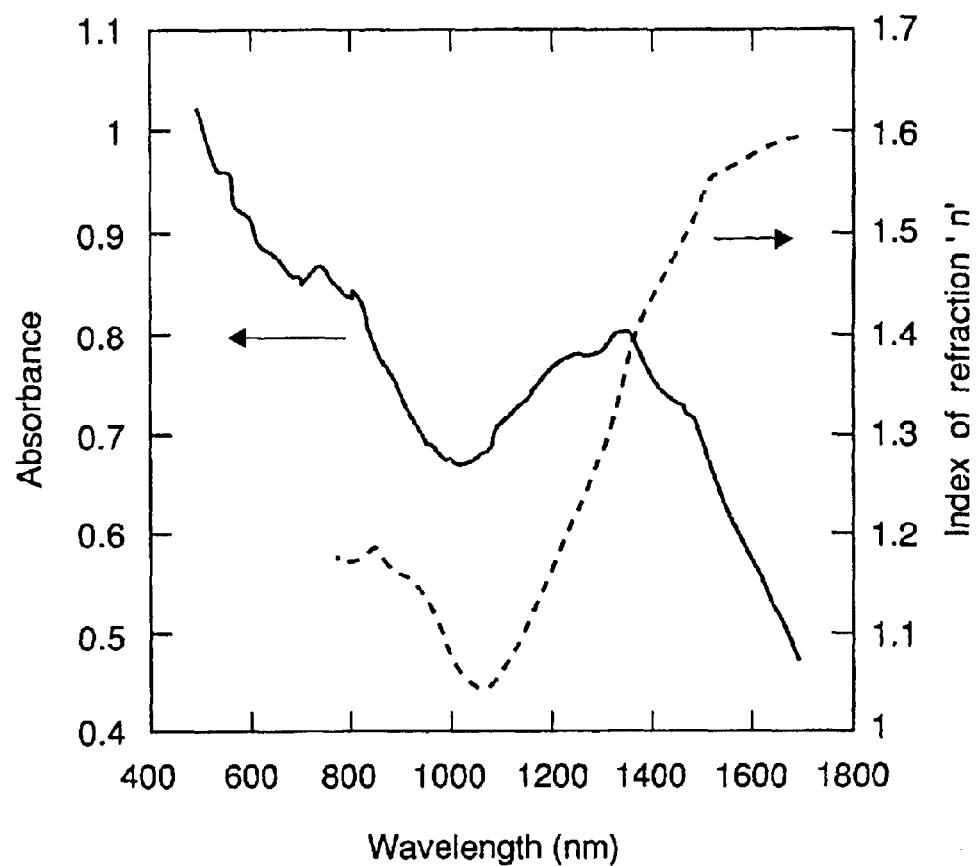
FIG. 1 is a graphical representation showing an absorption spectrum, and a refractive index dispersion curve measured with a spectral ellipsometer v.s. a wavelength of a light in a carbon nanotube thin film in a test for evaluating the characteristics of the carbon nanotube thin film.

The present invention will hereinafter be described in detail. In the following description, first of all, a carbon nanotube peculiar to the present invention will now be described, and after evaluating the characteristics thereof, two preferred embodiments will be given.

Carbon Nanotube Thin Film

In general, carbon nanotubes are classified into a single wall carbon nanotube composed of one sheet of tube having a hexagon network structure of carbon, and a multi-wall carbon nanotube composed of a multi-layer (multi-wall) tube. While either of them may be used in the present invention, it is desirable that the single wall carbon nanotube having a high saturable absorption function be contained in a carbon nanotube thin film.

As for a used carbon nanotube, in particular, a single wall carbon nanotube, its diameter is preferably in the range of 0.8 to 1.3 nm. The carbon nanotube the diameter of which falls within the above-mentioned range is contained to thereby effectively discover the saturable absorption function. A diameter of the carbon nanotube is more preferably in the range of 1.1 to 1.3 nm.

In the present invention, utilized is light absorption of a pseudo one-dimensional exciton accompanying an interband transition due to one-dimensional van Hove singularity of a carbon nanotube appearing in a 1.5 ?m band. The wavelength of this absorption is largely changed depending on a diameter of a carbon nanotube. This reason is that the energy gap of the carbon nanotube is in proportion to a reciprocal of the diameter. Consequently, the absorption peak wavelength can be adjusted by changing the diameter of the carbon nanotube.

Since the fundamental absorption of the carbon nanotube in the 1.5 μm band other than this absorption is not large so much, even if a large number of kinds of carbon nanotubes are mixed with one another, this material can show the desired function. This reason is that if a considerable quantity of carbon nanotubes which is mixed which shows the absorption concerned in the wavelength wanted to be used, then the proper light absorption can be expected, and other carbon nanotubes do not exert a large influence on the absorption. However, if the diameter distribution remarkably spreads, then the light absorption by the carbon nanotubes other than the carbon nanotube concerned (since this light absorption corresponds to the lower part absorption of the p plasmon laying the ultraviolet, there is no effect of the saturable absorption) exerts a large influence thereon, and hence the performance of the resultant optical element may be deteriorated.

A method of manufacturing a carbon nanotube for use is not especially intended to be limited. Hence, any of the conventionally known manufacturing methods such as a thermal decomposition method using catalyst (this method is similar to a chemical vapor deposition method; refer to an article of P. Nikoloev et al: Chemical Physics Letters, 313(1999), pp. 91 to 97), an arc discharge method, and a laser evaporation method may be adopted. In addition, in order to remove impurities contained in the manufactured carbon nanotubes to increase the purity, the refining may be carried out.

A thin film made of carbon nanotubes as described above is formed to thereby obtain a carbon nanotube thin film. A method of forming such a thin film is not especially limited as long as a formation method whereby a thin film made of carbon nanotubes is finally obtained is adopted. Specific examples of the method include a spraying method, an electrophoresis film forming method, a polymer dispersion method, a cast coating method, and a dip application method. The former three methods of those thin film forming methods will hereinbelow be described.

(Spraying Method)

The above-mentioned spraying method means a method in which dispersion liquid is used which is obtained by dispersing carbon nanotubes in a dispersion medium, followed by the spray-application to thereby form a thin film, and in general, is referred to as a spraying application.

Carbon nanotubes are dispersed in a suitable dispersion medium to thereby prepare dispersion liquid. Usable dispersion media include alcohol, dichloroethane, dimethylformamide, and chloroform. Then, dichloroethane and dimethylformamide are preferable in terms of the fact that dispersibility is very excellent and also the film quality of a resultant thin film is satisfactory. In particular, dimethylformamide is preferable. On the other hand, alcohol is preferable in terms of high volatility. Examples of such an alcohol include methanol, ethanol, isopropyl alcohol (IPA), and n-propyl alcohol. Of those, ethanol is especially preferable.

Note that, in a case where dimethylformamide or dichloroethane is used as the dispersion medium which is inferior to other materials in terms of volatility but is satisfactory in other performances, when carrying out the spraying application, such coping as to hold a temperature of a work at a high level or to form a film by taking much time with a less spray quantity is taken, whereby the disadvantage concerned with the volatility is solved.

When preparing the dispersion liquid, if necessary, an additive such as a surface active agent may be used. As for the surface active agent, one which is generally used as a dispersion agent is suitably used. Preferable examples of the surface active agent include one having a polarity, and one having a functional group which is easy to be chemically coupled to a carbon nanotube.

The concentration of a carbon nanotube in the dispersion liquid is not especially limited. However, when dimethylformamide is used as the dispersion medium, the concentration thereof is preferably in the range of 1 to 2 mg/ml.

In order to uniformly disperse the carbon nanotubes after having added the carbon nanotubes and the additive added as required to the dispersion medium, the dispersion medium is desirably sufficiently stirred. A unit for use in stirring is not especially limited but may include a stirring vane type stirrer, a kneader, a roll mill, and an ultrasonic dispersion unit. Among those, the ultrasonic dispersion unit is preferable.

The dispersion liquid obtained in a manner as described above is spray-applied to a predetermined work. A technique for the spraying application is not especially limited, and hence the spraying application can be carried out with a known unit, conditions and the like. For example, the spraying application can be carried out with an airbrush. At this time, since the carbon nanotubes in the dispersion medium are easy to cohere, it is also effective that an ultrasonic wave is applied to a trap of the airbrush in order to disperse the carbon nanotubes.

In addition, during the spraying application, if a temperature of a work is low, then the dispersion medium does not readily evaporate, and as a result, the carbon nanotubes cohere on the surface of the work to become a large mass so that a film quality may get worse. Consequently, it is preferable that the hot blast be simultaneously sprayed to the work with a dryer, or the work be directly heated with a heater to raise a temperature of the work so that the sprayed solution evaporates in an instant.

(Electrophoresis Film Forming Method)

Carbon nanotubes with concentration of about 0.4 to about 0.5 mg/ml are dispersed in a dispersion medium similar to the case of the spraying method using dimethylformamide or the like, and then, a sodium hydroxide solution of 50 mass % is added to the resultant solution (external addition) by about 1 mass %. Then, a pair of electrodes are inserted about 1 cm apart into this dispersion liquid and then a D.C. voltage is applied across both the electrodes. The applied voltage is preferably about 20 V. The carbon nanotubes migrate onto a surface of the positive electrode by the application of the voltage to be deposited thereon to form a thin film. That is to say, in this method, the positive electrode becomes a work.

(Polymer Dispersion Method)

The above-mentioned polymer dispersion method means a method in which refined carbon nanotubes are dispersed in an organic solvent solution containing a polymer such as polyimide or polystyrene, and then the resultant solution is applied to a surface of a work with arbitrary application means such as a spin coater. According to this method, a uniform film is obtained, and hence this method is an effective technique. But, in a case where a mixing ratio of carbon nanotubes in a dispersion film cannot be increased, there is a disadvantage in that an absorption coefficient of the film is reduced.

While any usable polymer can be adopted as long as a film can be formed therewith, polystyrene or the like is preferable which exerts only a little influence on carbon nanotubes. In addition, it is also effective to use polyimide or the like which is little in absorption in the communication wavelength region. As for an organic solvent, one in which the used polymer can dissolve may be suitably selected. The concentration of the polymer in the organic solvent solution may be suitably adjusted in accordance with the application suitability.

(Other Methods)

It is also effective that a work such as a substrate be inserted into a carbon nanotube manufacturing system to directly scavenge the carbon nanotubes on a surface of the work. After completion of the formation of a film, if amorphous carbon as impurities is removed in the air by utilizing the oxidation method, and then the metal catalyst is removed in the vacuum by utilizing the high temperature heating sublimation method, then the thin film just after completion of the thin film formation can be refined into carbon nanotubes having sufficiently high purity. Thus, it is possible to obtain a utilizable carbon nanotube thin film.

The carbon nanotube thin film is formed in a manner described above. As for a quantity of deposition of the carbon nanotubes in the formed carbon nanotube thin film, for the purpose of making a sufficient saturable absorption function appear in the carbon nanotube thin film concerned, transmittance in an objective wavelength is preferably made fall within the range of about 0.1 to about 10%, and is more preferably made about 1%. In addition, a specific film thickness is preferably in the range of 100 to 600 nm, and is more preferably in the range of 200 to 300 nm.

A work on which the carbon nanotube thin film includes a substrate such as a glass substrate or a quartz substrate, an optical material, and an optical element.

The carbon nanotube thin film obtained in a manner described above shows plural absorption wavelength regions in an infrared region. In the present invention, it is desirable that the absorption wavelength region of the lowest energy be adjusted so as to fall within the range of 1.2 to 1.6 ?m as a communication wavelength region. Then, the absorption wavelength region concerned can be adjusted by selecting suitably diameters of used carbon nanotubes.

The carbon nanotube thin film as described above can be operated at a high efficiency in the communication wavelength region by utilizing the saturable absorption function of the film concerned in a resonance region.

Thus, in a case where the carbon nanotube thin film is used as a very high speed optical switching material in the communication wavelength region, the film is considered to have has the following superior features as compared with any of semiconductor materials.

First of all, a cost of a semiconductor element can be suppressed to a very low level. The carbon nanotube is relatively inexpensive in raw materials as compared with any of other semiconductor materials, and hence mass production thereof is possible. In addition thereto, since the carbon nanotube does not require a process for forming a quantum structure such as semiconductor quantum wells through the vacuum process, and a thin film has only to be directly formed on a surface of a work such as a substrate, the manufacture thereof is simple, and yield thereof is also excellent. From those respects, it is expected that an optical element can be manufactured at a cost which is lower than that in case of any of semiconductor materials by several digits.

Secondly, a thin film having a large area can be readily obtained. When a thin film having the same function is intended to be formed using any of conventional semiconductor materials, an area thereof can be increased to some extent. However, in order to attain this, since a larger vacuum system is required accordingly, a manufacture cost is extremely increased. In case of the carbon nanotube thin film, since the film can be thinned by utilizing a simple application method such as the spraying application method, no limitation is imposed on a resultant film area, and also the formation handling itself is easy.

Thirdly, with respect to the durability of the material, since the carbon nanotube is structured by only a strong bond called the sp2 covalent bond of carbon atoms, and has high electric conductivity so that the heat is difficult to be accumulated therein, very high durability and light resistance are expected therefor.

In addition, since the carbon nanotube is stable in the air and does not burn up to about 500 degrees, it can be used in the air at high temperatures. Since the structure of the carbon nanotube is not changed up to 1,600 degrees in a vacuum, the carbon nanotube can be used at higher temperatures in a vacuum.

(Characteristics of Carbon Nanotube Thin Film)

Next, characteristics of the carbon nanotube thin film (including the time response characteristics) were evaluated.

A material having the single wall carbon nanotubes as a main constituent was used as a material of which the carbon nanotube thin film was made. The material concerned was manufactured on the basis of a vapor phase catalytic reaction (the thermal decomposition method using a catalyst) under a high pressure (manufactured by CNI Inc. (Carbon Nanotechnologies Inc.)). This material at a concentration of 0.005 mass % was dispersed in dimethylformamide, and then was sprayed to form a thin film while heating a glass substrate.

An absorption spectrum of the resultant carbon nanotube thin film, and a refractive index dispersion curve measured with a spectral ellipsometer are shown in FIG. 1. In FIG. 1, the axis of abscissa represents a wavelength of a light, the left-hand axis of ordinate represents absorbance (indicated by a solid line in the graph), and the right-hand axis of ordinate represents a refractive index (indicated by a broken line in the graph), As apparent from the graph shown in FIG. 1, an absorption peak wavelength was 1.3 ?m and a thickness obtained with the spectral ellipsometer was 270 nm. In view of the absorption peak wavelength, diameters of the carbon nanotubes are expected to be distributed with 1.1 nm as a center. Note that, as described above, the absorption peak wavelength can be adjusted by changing the diameters of the carbon nanotubes.

In the graph shown in FIG. 1, the refractive index shows such low values as to fall within the range of 1.1 to 1.6 in the light wavelengths of 1.2 to 1.6 $\mu$m. This is supposedly because since the carbon nanotube thin film is not dense, and includes a large number of holes, the mean value with air is calculated. This is also applied to a relationship between a thickness and absorbance. Thus, it is expected that if the carbon nanotube thin film is dense, then it shows the much larger absorbance.

Next, verification will hereinbelow be made with respect to the time response characteristics of an absorption change of the carbon nanotube thin film.

The time response characteristics of the carbon nanotube thin film were measured by utilizing a pump-probe method. A pulse light (pump light) of a high intensity with 1.3 $\mu$m central wavelength was applied to the carbon nanotube thin film obtained in a manner as described above, and then a pulse light (probe light) of a low intensity with the same central wavelength which was obtained by giving the pump light a time difference was applied to the same carbon nanotube thin film. The application time of the probe light was changed relative to that of the pump light (they were given a relative time difference), and then the absorption change induced in the carbon nanotube thin film by the application of the pump light was measured with the probe light. A light in the communication wavelength region which was obtained by reconstructing and amplifying a titanium-sapphire laser pulse with an optical parametric amplifier to convert the resultant pulse thereinto was used as the pump light and the probe light used at that time. A pulse width was about 120 fs (fs=$10^{-5}$ sec), and the relative time difference between the pump light and the probe light was made change in the range of −2 to 10 ps.

Figure 2:
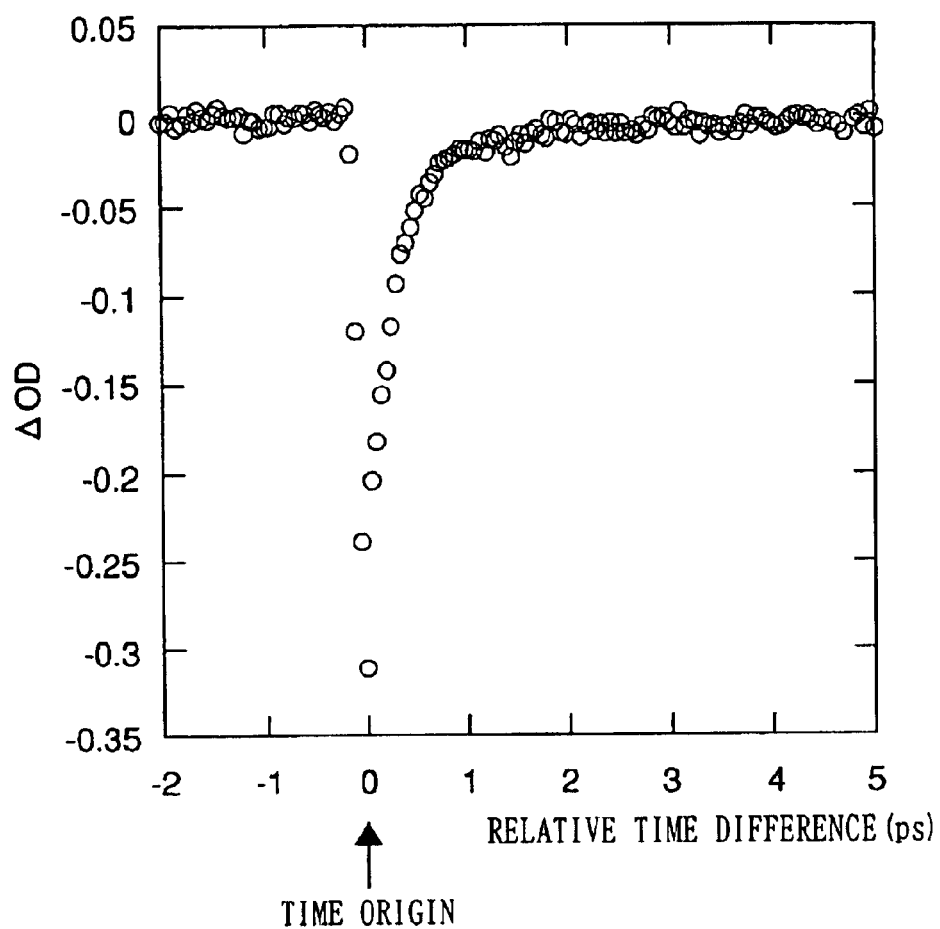
FIG. 2 is a graphical representation which is obtained by plotting data of an absorption change in a carbon nanotube thin film observed from a probe light when applying a pump light against a relative time difference in a test for evaluating the characteristics of the carbon nanotube thin film.

FIG. 2 is a graph in which data of absorption changes of the carbon nanotube thin film observed with the probe light when applying the pump light of 6.5 pJ/$\mu$m$^2$ is plotted against the relative time difference. From the graph shown in FIG. 2, it is understood that an abrupt decrease of absorbance due to the absorption saturation is generated at the time origin (at a timing in which no relative time difference is caused between the pump light and the probe light, i.e., both the lights are simultaneously applied to the carbon nanotube thin film), and then the absorbance recovers for a very short period of time.

Figure 3:
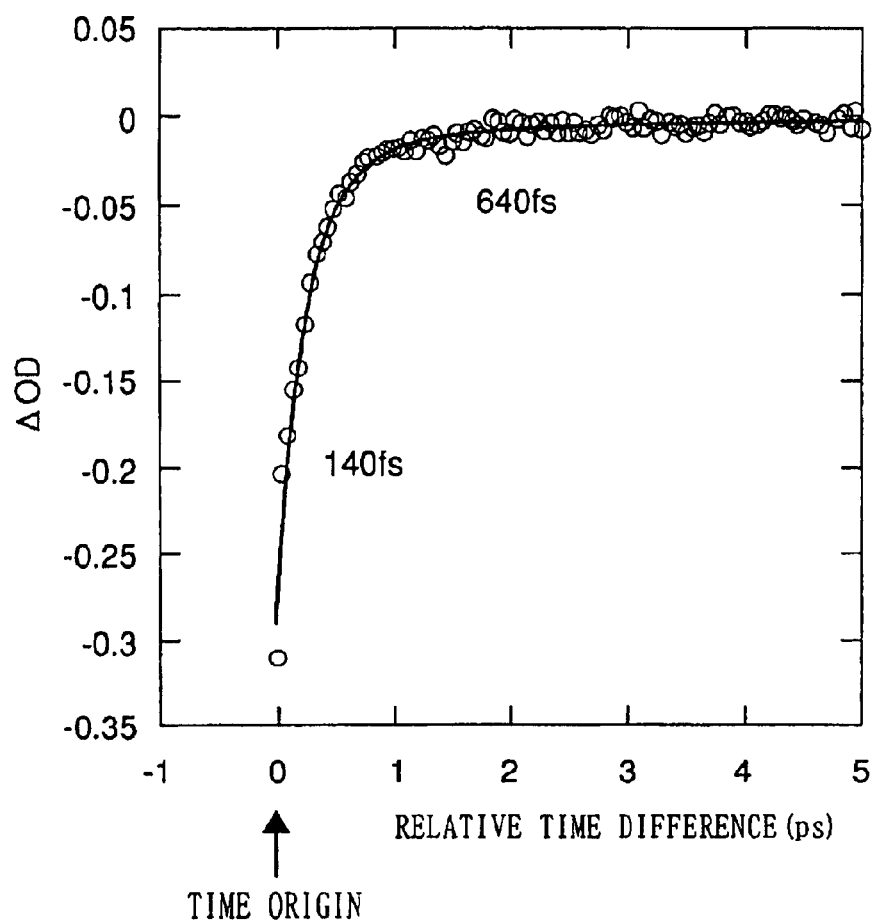
FIG. 3 is a graphical representation of an attenuation curve to which the plotting of data for the graph shown in FIG. 2 is fitted on the assumption of a two-components series function curve which exponentially attenuates.

FIG. 3 is a graph of an attenuation curve to which plotting of the data of the graph of FIG. 2 is fitted on the assumption of a two-component series function curve which exponentially attenuates. As apparent from FIG. 3, the attenuation curve is satisfactorily fitted. Then, halfvalue time constants of those components were determined to be 140 fs and 640 fs, respectively. The results show that the absorption change at the time origin takes only 0.44 ps to recover up to 80%, and the absorption change at the time origin takes only 0.69 ps to recover up to 90%.

Note that, since in the graphs shown in FIGS. 2 and 3, the absorbance change is defined as a quantity of change against a quantity of transmitted light when there is no pump light, in actuality, a quantity of transmitted light is increased twofold at the time origin. From those results, it is understood that if the pump light and the probe light are judged as a control light and a signal light, respectively, then the signal light can be ON/OFF-controlled at a switching speed equal to or slower than 1 ps and at a doubled S/N ratio with the control light.

In addition, a third order non-linear optical constant ($?_f(3)$) of the carbon nanotube thin film in a light wavelength of 1.3 $\mu$m was also evaluated. Here, "the third order non-linear optical constant" means a barometer showing that a driving energy when a material is used as an optical switch can be further reduced as $?_f(3)$ of this material is larger. But, it should be noted here that since in case of the carbon nanotube thin film, the film is not dense as described above, that value is not a value representing a limit of an ability of a material.

An absorption saturation curve, a thickness and a refractive index were optically evaluated, and as a result, $?_f(3)$ was found to be $-1.2 \times 10^{-15}$ (m$^2$/V$^3$) (=$-8.5 \times 10^{-8}$ (esu)). Thus, it is understood that since phthalocyamine known as an organic non-linear optical material which is easy to be thinned similarly to a carbon nanotube and shows high non-linearity has a non-linear optical constant of $10^{-10}$ to $10^{-12}$ esu, the carbon nanotube shows a large X$_f(3)$ which is 100 times or more as large as that of any of the existing organic non-linear optical materials in the infrared wavelength region, and moreover, has the possibility to form a greatly high performance material as compared with any of conventional materials depending on future improvements in a film quality.

First Embodiment

Figure 4:
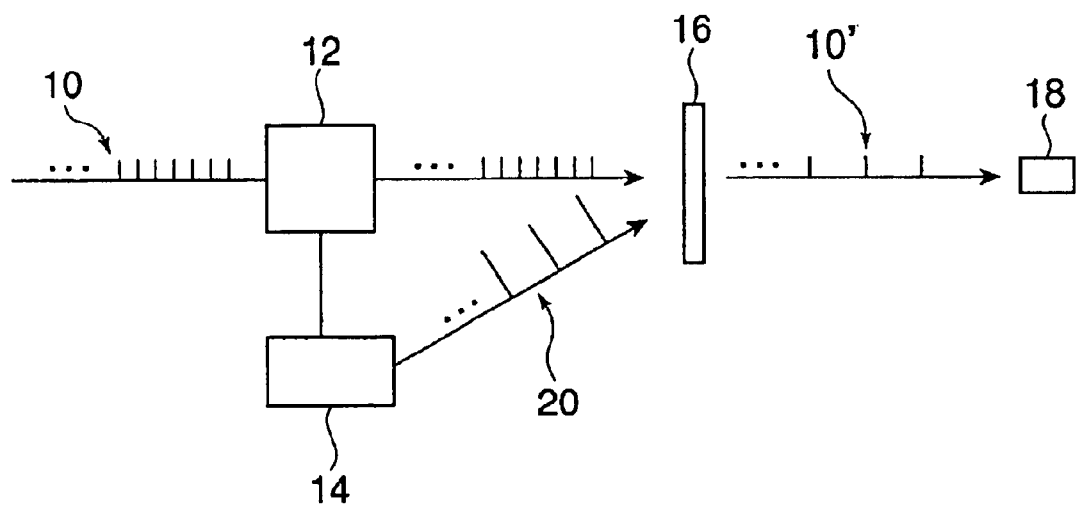
FIG. 4 is a schematically constructional view showing a first embodiment as an example of an optical switching system of the present invention.

FIG. 4 is a schematically constructional view showing a first embodiment as one example of an optical switching system of the present invention. In FIG. 4, reference numeral 10 designates a signal light composed of a light pulse train; 12, a clock extracting unit (clock extracting unit); 14, a control light source (control light applying unit) that applies a control light; 16, a CNT thin film (light control portion) as a thin film made of carbon nanotubes; and 18, a signal detecting portion (signal detecting unit) such as a photodiode or a CCD device.

The signal light 10 is transmitted over an optical fiber or the like from an external communication network or the like to be taken out and then is controlled by the optical switching system of this embodiment. The signal light 10, in this embodiment, is composed of a signal light pulse train having a high repetitive frequency on the order of $10^{19}$ to $10^{12}$ pulses/sec in an absorption wavelength region of the CNT thin film 16. In addition, for realizing high non-linear performance, it is desirable that a light intensity be high, and thus, used light pulses desirably have a short time width on the order of $10^{-12}$ to $10^{-15}$ sec.

The signal light 10 emitted through the optical fiber or the like, firstly, is made incident on the clock extracting unit 12. In this embodiment, a 3R-regenerator ("3R" means Re-amplification, Re-timing, and Re-shaping) is adopted for the clock extracting unit 12. Thus, the clock extracting unit 12 has a function of correcting and shaping a repetitive frequency, a time width and the like of the pulses of the signal light 10, and hence measures a timing of the pulses of the signal light 10 in that process to synchronize pulses of a control light 20 from the control light source 14 with the pulses of the signal light 10. Of course, in the present invention, the shaping function and the like are not the essential requirements, and hence the clock extracting unit 12 has only to have the function of synchronizing the pulses of the control light 20 from the control light source 14 with the pulses of the signal light 10. However, a waveform or the like of the pulses of a signal light taken out from a network is normally delicately distorted, and in general, the shaping for the waveform or the like is required for the processing thereof, and moreover, a timing of the pulses of the signal light can be measured during the shaping therefor. Hence, this embodiment using the 3R-regenerator in the clock extracting unit 12 is preferable.

Examples of the 3R-regenerator include one described in an article of P. Brindel et al.: The 8-th International Workshop on Femtosecond Technology Abstracts (2000), pp. 19 to 22. Also, in recent years, one which can be operated at 80 Gbit/s is also reported in an article of M. Nakazawa et al. : Electronics Letters, 35 (1999), pp. 1358 to 1359, or the like.

Pulses of the control light 20 synchronous with the pulses of the signal light 10 are applied from the control light source 14 in accordance with the signal from the clock extracting unit 12. Note that, at this time, the control light source 14 may be incorporated in the clock extracting unit 12, or may be provided in the form of an external light source as in this embodiment and a signal light from the external light source may be modulated with the extracted clock signal.

A repetitive frequency of the control light 20 synchronous with the pulses of the signal light 10 is desirably equal to or lower than $\frac{1}{10}$ of that of the signal light 10, and is more preferably equal to or lower than $\frac{1}{1,000}$ of that of the signal light 10. The optical switching system is constructed so that the plural pulses of the signal light 10 are controlled with one pulse of the control light 20, whereby the signal light 10 having a high repetitive frequency can be controlled with the control light 20 having a low repetitive frequency. Consequently, very high speed light pulses can be controlled as the signal light 10.

With respect to the pulse of the control light 20 as well, for realizing high non-linear performance, it is desirable that a light intensity be high, and hence, used light pulses desirably have a short time width on the order of $10^{-12}$ to $10^{-15}$ sec.

Next, both the signal light 10 and the control light 20 are made incident on the CNT thin film 16. The basic operation at this time is as follows. When the control light 20 is absent, the signal light 10 cannot be transmitted through the CNT thin film 16 because of absorption of the signal light 10 by the CNT thin film 16. On the other hand, when the control light 20 is present, absorption saturation is induced in the CNT thin film 16 by the control light 20, and hence the absorption in the CNT thin film 16 is temporarily decreased so that the signal light 10 can be transmitted through the CNT thin film 16.

At this time, assuming that each of time intervals of the pulse train of the signal light 10 is set to, for example, 3 or more times as large as a recovery time of an absorption change of the CNT thin film 16, and under this condition, continuous two pulses of the signal light 10 are applied to the CNT thin film 16, and also only one pulse of the control light 20 is applied thereto concurrently with the application of the first pulse of the continuous two pulses of the signal light 10, both the continuous two pulses of the signal light 10 cannot be transmitted through the CNT thin film 16. As a result, only the pulse of the signal light 10 arriving at the CNT thin film 16 concurrently with arrival thereat of the pulse of the control light 20 is picked up to be transmitted through the CNT thin film 16.

A signal light 10' which has been selectively transmitted through the CNT thin film 16 in such a manner arrives at the signal detecting portion 18 to be converted into an electric signal by a photodiode or a CCD device. Note that, in the present invention, the signal detecting unit may be a unit that simply recombines detected light to an optical fiber or the like to transmit the detected light as well as a unit, such as a photodiode or a CCD device, adapted to detect a signal to convert the detected signal into another signal.

In such a manner, the operation for optically picking up a pulse train of a signal light having a high repetitive frequency in accordance with a control signal becomes possible.

(Verification Test of Function of First Embodiment)

A (one-input one-output type) optical switching system similar to that of the first embodiment was manufactured to confirm the operation of a very high speed absorption change, whereby the function of the optical switching system of the first embodiment was verified. Note that, since the verification test concerned chiefly aimed at the function demonstration, no clock extraction was carried out, and two lights generated by optically separating a light from the same light source by a half mirror or the like were judged as a signal light and a control light (a pseudo signal light and a pseudo control light), respectively.

Figure 5:
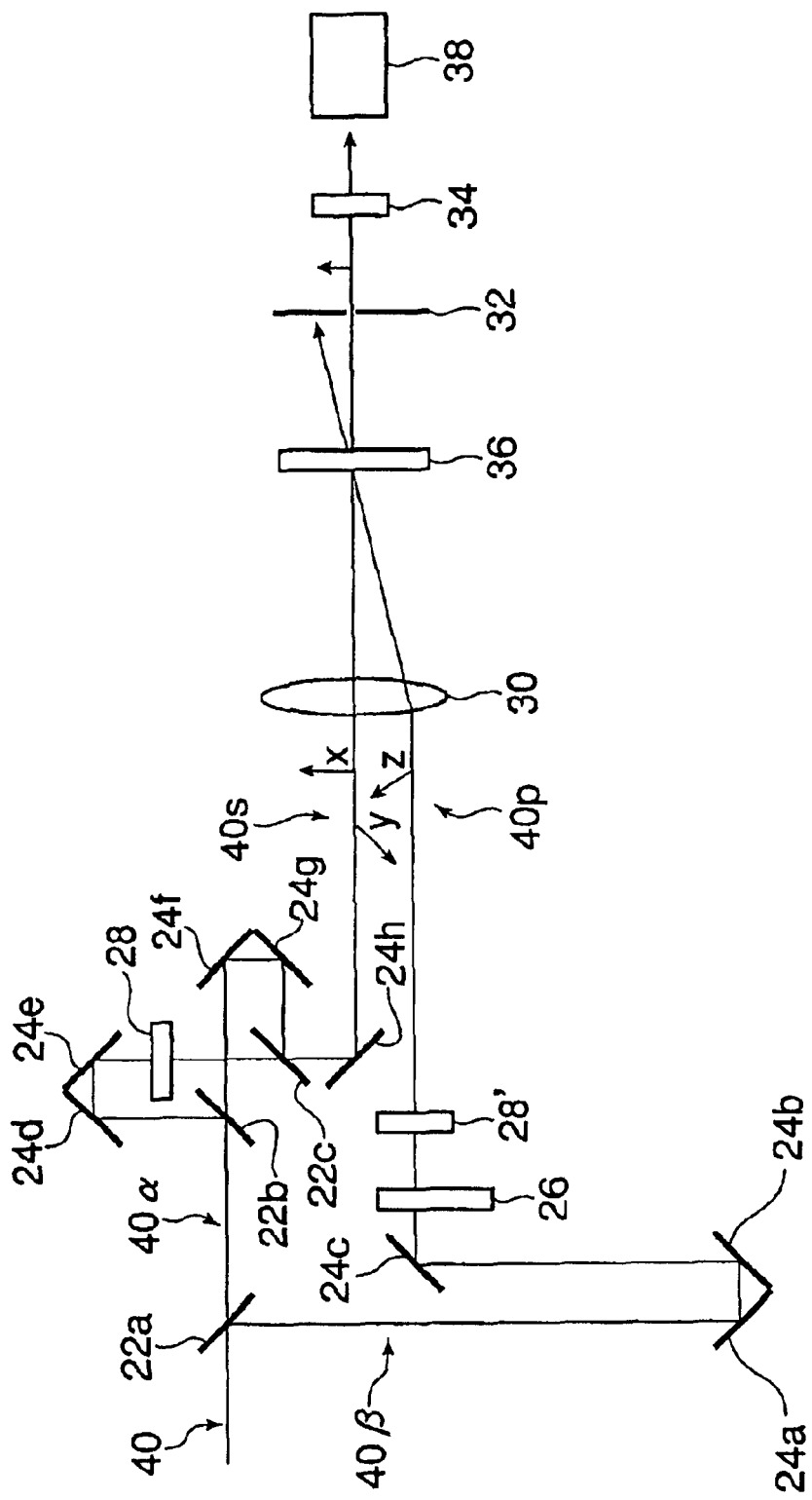
FIG. 5 is a schematically constructional view showing a one-input one-output type optical switching system for use in a verification test for the first embodiment.

FIG. 5 is a schematically constructional view showing the one-input one-output type optical switching system used in this verification test. In FIG. 5, reference numeral 36 designates a CNT thin film as a light control portion, and reference numeral 38 designates a CCD device as a signal detecting unit. Then, this system is constructed so that light pulses 40s judged as a signal light are controlled with a light pulse 40p judged as a control light. In actuality, half mirrors 22a to 22c, mirrors 24a to 24h, an ND (neutral density) filter 26, halfwave plates 28 and 28', and the like are combined with one another for arrangement, whereby a light 40 from one light source is optically separated, and is adjusted with respect to an intensity and a polarization direction thereof, and also a timing is adjusted therefor to generate the pseudo signal light 40s and the pseudo control light 40p.

A carbon nanotube thin film, having an absorption maximum at 1.3 µm, which was manufactured in the above-mentioned section <Characteristics of Carbon Nanotube Thin Film> was used for the CNT thin film 36.

In addition, used as the light 40a was light (a pulse train having a pulse width of about 120 ps and a repetitive frequency of 1 kHz) which was obtained by reconstructing and amplifying titanium-sapphire laser pulses to convert the resultant pulses into a light with 1.3-µm wavelength by an optical parametric amplifier.

First of all, the light 40 is optically separated into two parts by the half mirror 22a. One (40a) of the two parts obtained by optically dividing the light 40 was converted into a continuous two-pulse train corresponding to repetition of 1 THz to obtain the pseudo signal light 40s using plural retroreflectors (including the half mirrors 22b and 22c, and the mirrors 24d to 24h). A pulse interval was set to 1 ps corresponding to repetition of 1 THz. At this time, for the purpose of detecting a signal, polarization directions of the two pulses are made orthogonal to each other by the half-wave plate 28 (indicated by x and y in FIG. 5).

In addition, the other (40β) obtained through the optical division was adjusted with quantity of light thereof by the ND filter 26 to obtain the pseudo control light 40p. At this time, for the purpose of giving the two signal lights orthogonal to each other the same non-linear effect, that light is polarized by the halfwave plate 28' (indicated by z in FIG. 5) to be shifted so that a polarization direction thereof makes 45 degrees with that of the two pulses (indicated by x and y in FIG. 5) of the pseudo signal light 40s.

Note that, a ratio of distribution of light intensities when optically dividing the light 40 into two parts by the half mirror 22a is set so that the intensity of the light 40? becoming the pseudo control light 40p becomes 9 times as high as that of the light 40? becoming the pseudo signal light 40s.

Both the pseudo signal light 40s and the pseudo control light 40p were applied to a plano-convex lens 30 with 120-nm focal length to be condensed so as to become a spot with 150-µm diameter on a surface of the CNT thin film 36.

Note that, in the present invention, as in this verification test, a signal light and a control light applied to a light control portion are preferably condensed on an irradiation surface of the light control portion. If the signal light to be applied to the light control portion is condensed to increase an intensity thereof, then the throughput of the signal light in the light control portion can be enhanced. On the other hand, if the control light to be applied to the light control portion is condensed to increase an intensity thereof, then the intensity of the control light applied from the control light applying unit can be suppressed all the more since the control light becomes easy to be made the energy high enough to provide the absorption saturation of the light control portion, and hence it is possible to enhance the energy efficiency. Since if any one of the signal light and the control light is condensed, then the condensing effect is obtained, even the condensing of any of them may be available. However, both of them are preferably condensed. In addition, while two lights may be condensed by one condensing unit as in this verification test, different condensing units may also be provided, respectively. In other words, "the first condensing unit" and "the second condensing unit" described above may be different from each other, or as in this verification test, one condensing unit may serve both as the first and second condensing units.

In this verification test, each of the pseudo signal light 40s and the pseudo control light 40p has a spot diameter of 150 µm on the surface of the CNT thin film 36. Then, in the present invention, a spot diameter of the condensed signal light and/or the condensed control light on the irradiation surface of the light control portion is preferably in the range of 10 to 200 µm, and is more preferably in the range of 10 to 50 µm.

Now, the discussion is returned back to this verification test.

An angle which the pseudo signal light 40s and the pseudo control light 40p make with each other when being applied to the surface of the CNT thin film 36 was set to about 20 degrees, and the arrangement of the mirrors 24a and 24b were adjusted to measure a timing so that the pulse of the pseudo control light 40p was synchronized with any one of the two pulses of the pseudo signal light 40s. Then, the pseudo control light 40p was cut by the filter 32 and a transmitted component of the pseudo signal light 40s was then received by the CCD device 38 through the polarizer 34. The received signal was observed, and then it was judged on the basis of a polarization direction thereof which of the continuous two pulses of the pseudo signal light 40s was transmitted.

As a result of the verification test, it was confirmed that only the pulse of the pseudo signal light 40s synchronous with the pseudo control light 40p was selectively transmitted through the CNT thin film 36. Thus, the test results show that an absorption change of the CNT thin film 36 induced by the application of the pseudo control light 40p judged as the control light recovered at a very high speed, whereby only one of the adjacent pulses of the pseudo signal light 40s judged as the signal light was selectively transmitted through the CNT thin film 36. As a result, from this verification test, it was verified that a very high speed optical switching system could be constructed.

Note that, in this verification test, a ratio in light intensity of the transmitted light of the synchronous signal pulse (pulse of the pseudo signal light which was synchronous with the pseudo control light and transmitted) to the transmitted light of the asynchronous signal pulse (pulse of the pseudo signal light which was not synchronous with the pseudo control light and could not transmit) was about 1.5/1 (synchronous signal pulse/asynchronous signal pulse) when a light intensity of the pseudo control light 40p was about 6 $pJ/\mu m^2$. In addition, a transmission loss of the pseudo signal light 40s was about 17 dB.

Second Embodiment

Next, a description will hereinbelow be given with respect to a second embodiment as another example of the optical switching system of the present invention. The optical switching system of this embodiment is a system in which the irradiation surface of the light control portion is divided into plural areas, and the areas obtained through the division are independently and in parallel optically controlled, whereby the light distribution can be spatially carried out with the signal control light. Also, the optical switching system is such that the above-mentioned carbon nanotube thin film is adopted as a material of an optical switch (very high speed optical switch) for a light distributing device as the invention described in JP 11-015031 A by the inventors of the present invention. First of all, operation principles thereof will hereinbelow be described.

FIGS. 6(A) to 6(D) are respectively schematic views, when viewed from a cross section, useful in explaining an operation state of the system of this embodiment. A signal light 150 a wave surface of which has sufficiently spread is made incident perpendicularly on a light control portion 156 composed of a carbon nanotube thin film (as an example, a case of continuous six pulses is shown in FIGS. 6(A) to 6(D)). On the other hand, a pulse-like control light 160 a wave surface of which has similarly spread is made incident on the light control portion 156 from a direction inclined with respect to the light control portion 156 (refer to FIG. 6(A)).

Figure 6A:
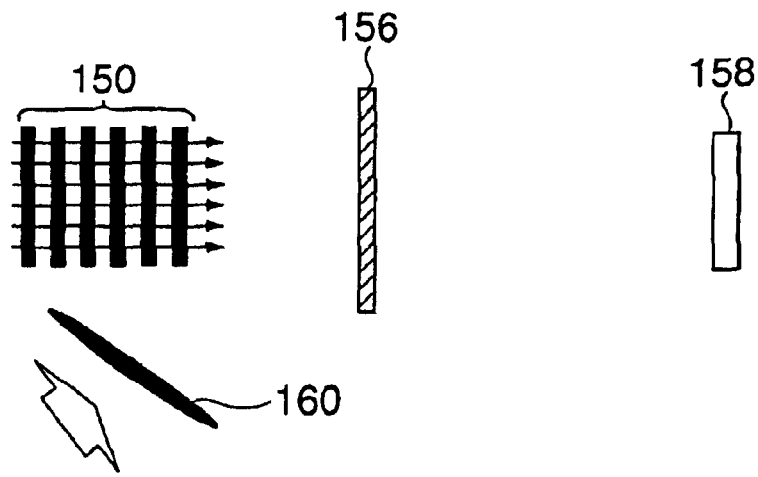
FIG. 6(A) is a schematic view as viewed in cross section useful in explaining an operation state of a second embodiment as another example of an optical switching system of the present invention, and a state before a signal light and a control light are made incident on a light control portion.
Figure 6B:
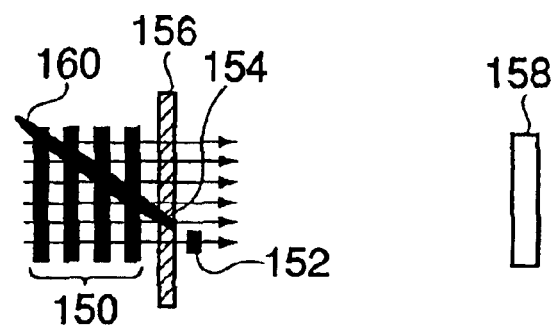
FIG. 6(B) is a schematic view as viewed in cross section useful in explaining an operation state of a system of the second embodiment, and an initial state in which a signal light and a control light are made incident on a light control portion.
Figure 6C:
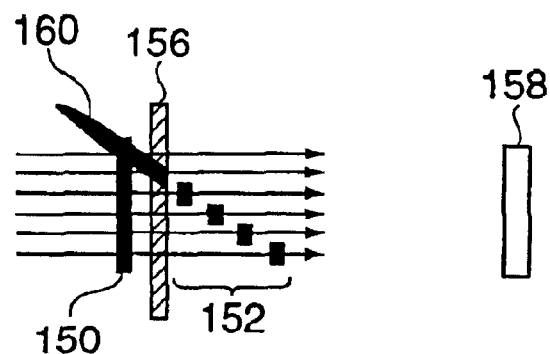
FIG. 6(C) is a schematic view as viewed in cross section useful in explaining an operation state of the system of the second embodiment, and a final state in which a signal light and a control light are made incident on a light control portion.

Since there is an optical path difference for the control light 160 due to the inclination with respect to the light control portion 156, at a certain moment, only an optical switch 154 of an optical switch line which is obtained by dividing an irradiation surface of the light control portion 156 into plural areas can be operated (refer to FIG. 6(B)).

Since only the optical switch 154 located in the position where the signal light 150 crosses the control light 160 is operated, only a part, of the signal light 150 which has arrived at the surface of the light control portion 156, corresponding to the position concerned is cut down. Thus, the individual pulses of the signal light 150 are respectively cut down at the different spatial positions due to differences in time of arrival of the control light 160 at the light control portion 156 (refer to FIG. 6(C)).

Figure 6D:
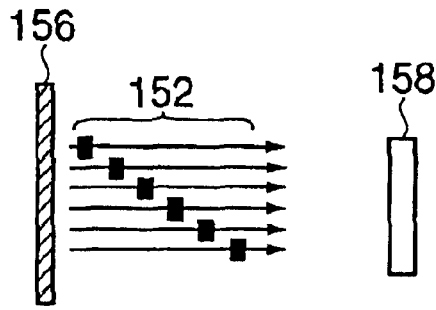
FIG. 6(D) is a schematic view as viewed in cross section useful in explaining an operation state of the system of the second embodiment, and a state in which a signal light and a control light have been transmitted through a light control portion to spatially cut down the signal light in parallel.

Output signal lights 152 which have been spatially cut down can be planarly allocated onto the elements of the signal detecting unit 158, respectively, to be separately read out by the signal detecting unit 158 (refer to FIG. 6(D)).

Figure 7:
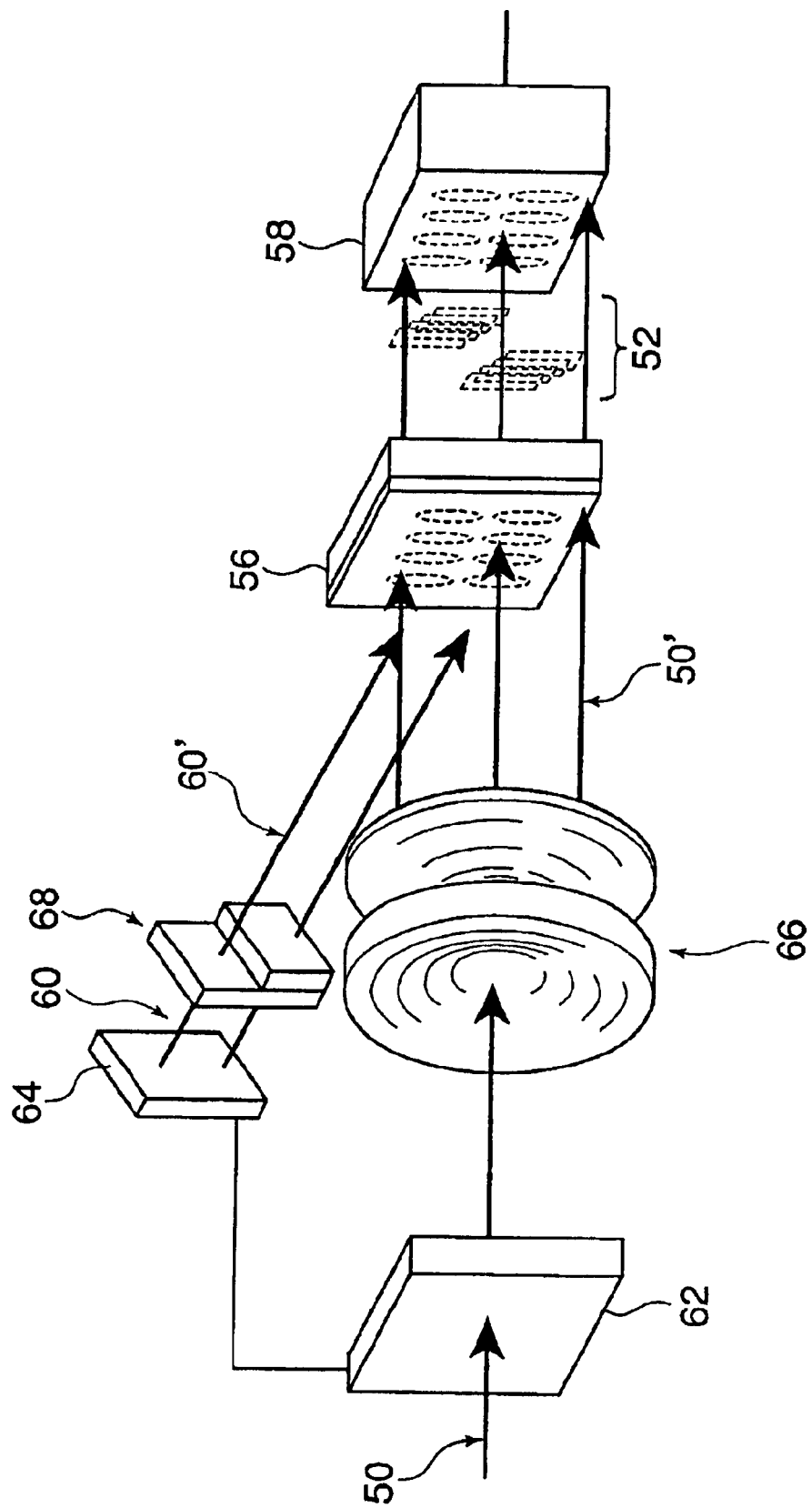
FIG. 7 is a schematically constructional view showing an optical switching system of the second embodiment.

FIG. 7 is a schematically constructional view showing the optical switching system of this embodiment to which the above-mentioned operation principles are applied. Note that, while in the above-mentioned operation principles, the description has been given of the mode in which the continuous six pulses of the signal light are linearly cut down, in this embodiment, the description will now be given of a mode in which continuous eight pulses of a signal light are cut down in the planar form of 4×2 areas by using an optical delay unit.

In FIG. 7, reference numeral 50 designates a signal light composed of a light pulse train. In addition, reference numeral 62 designates a clock extracting unit (clock extracting unit); 64, a control light source (control light applying unit) that applies a pulse-like control light a wave surface of which has spread; 56, a CNT thin film (light control portion) as a thin film made of carbon nanotubes; and 58, a signal detecting portion (signal detecting unit) such as a photodiode or a CCD device. Those components are basically the same in construction as those of the first embodiment (except that a function of allowing the application of pulses a wave surface of which has spread is required for the control light source 64).

The optical switching system of this embodiment further includes a lens (parallelizing unit) 66 that enlarges the signal light 50 to be applied to the CNT thin film 56 so as to cover the whole region of plural areas (4×2) of an irradiation surface of the CNT thin film 56 obtained through the virtual division to convert the enlarged signal light 50 into a parallel signal light 50', and an optical delay unit 68 adapted to optically delay pulses occupying a half area of the pulses of the control light a wave surface of which has spread.

The signal light 50 is transmitted through an optical fiber or the like from an external communication network or the like to be taken out, and firstly, is made incident on the clock extracting unit 62. Since the signal light 50 is the same as that of the first embodiment, and a function of the clock extracting unit 62 is also the same as that of the first embodiment, the detailed description thereof is omitted here. Then, the signal light 50 is enlarged by the lens 66 to be converted into the parallel signal light 50'. While a combination of a concave lens and a convex lens, for example, is given as the lens 66, such a lens has only to have a function of allowing the enlargement of the signal light 50 to convert the enlarged signal light into the parallel signal light 50'. Moreover, even an element other than a lens may also be adopted.

A pulse of the control light 60 synchronous with pulses of the signal light 50 is applied from the control light source 64 in accordance with a signal from the clock extracting unit 62. The control light 60, as described above, has a pulse-like shape with the wave surface being spread but, similarly to the signal light 50, may constitute a light obtained by enlarging a one-dimensional pulse light through a lens or the like to spread a wave surface thereof.

A repetitive frequency of the control light 60 synchronous with the pulses of the signal light 50 is desirably equal to or lower than ¹/₁₀ of that of the signal light 50, and is more preferably equal to or lower than ¹/₁,₀₀₀ of that of the signal light 50. The system is constructed so that the plural pulses of the signal light 50 are controlled with one pulse of the control light 60 (in this embodiment, the number of divided areas of the irradiation surface of the CNT thin film 56 as the light control portion is set to "the repetitive frequency of the signal light 500"/"the repetitive frequency of the control light 60"), so that the signal light 50 having a high repetitive frequency can be controlled with the control light 60 having a low repetitive frequency. Consequently, for the signal light 50, the control for a very high speed light pulse becomes with respect to the pulse as well of the control light 60, for realizing a high non-linear performance, it is desired that a light intensity be high, and hence it is desirable that a light pulse used therefor have a short time width on the order of $10^{-12}$ to $10^{-15}$ sec.

Figure 8:
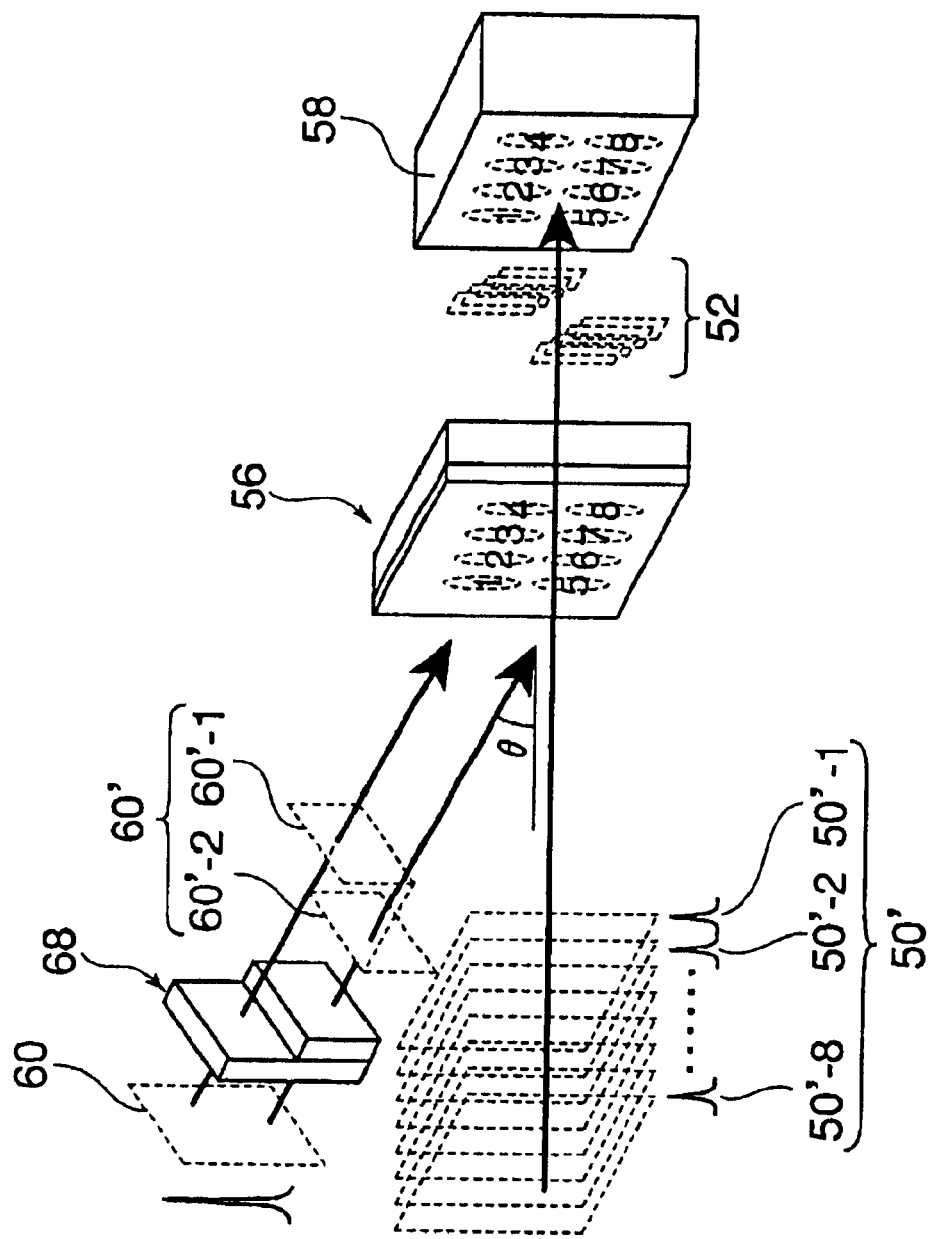
FIG. 8 is a conceptual view useful in explaining operation of the optical switch in the second embodiment.

Optical switching operation in this embodiment will hereinbelow be described. FIG. 8 is a conceptual view useful in explaining the optical switching operation in this embodiment. A signal light 50 as a pulse-like light is developed into a sheet-like parallel signal light 50'. Continuous eight light pulses 50'-1 to 50'-8 are successively made incident on the front of the CNT thin film 56 as the light control portion. On the other hand, the pulse-like control light 60 which has been spatially developed is also obliquely made incident on the CNT thin film 56 so as to make a predetermined angle ? with a travelling direction of the signal light 50 (parallel signal light 50'). Then, the control light 60 is partially given time delay by the light delay unit 68 to become a control light 60' two light pulses of which arrive at positions of the CNT thin film 56 at different time points, respectively. More specifically, a light pulse 60'-2 of a lower stage is adjusted so as to be delayed with respect to a light pulse 60'-1 of an upper stage in FIG. 8 by a period of time for four pulses of the signal light 50 (parallel signal light 50') to be made incident on the CNT thin film 56.

An irradiation surface of the CNT thin film 56, as shown in the figure, is virtually divided into eight areas (4×2). Each of the parallel signal light 50' and the control light 60' becomes a light which has spread within a surface perpendicular to a travelling direction thereof so as to cover the whole region of the eight areas obtained through the virtual division.

With respect to the synchronization of the control light 60 made by the clock extracting unit 62, more specifically, a timing is adjusted so that at the time when the light pulse 50'-1 as the head pulse of the parallel signal light 50' has arrived at the irradiation surface of the CNT thin film 56, the light pulse 60'-1 of the upper stage of the control light 60' has simultaneously arrived at the area 1 on the irradiation surface of the CNT thin film 56. In addition, with respect to the travelling direction of the control light 60', the angle ? is adjusted so that at the time when the light pulse 50'-4 as the fourth pulse of the parallel signal light 50' has arrived at the irradiation surface of the CNT thin film 56, the light pulse 60'-1 of the upper stage of the control light 60' has simul-taneously arrived at the area 4 on the irradiation surface of the CNT thin film 56. Then, the light pulses 50'-1 to 50'-4 as the pulses of the upper stage of the parallel signal light 50' are successively cut down in the areas 1 to 4 on the irradiation surface of the CNT thin film 56, respectively.

Moreover, the light pulse 60'-2 of the lower stage of the control light 60' is delayed with respect to the light pulse 60'-1 of the upper stage by a period of time for four pulses of the parallel signal light 50'. Thus, at the time when the light pulse 60'-2 of the lower stage of the control light 60' has arrived at the area 5 on the irradiation surface of the CNT thin film 56, the light pulse 50'-5 as the fifth pulse of the parallel signal light 50' has simultaneously arrived at the irradiation surface of the CNT thin film 56 to be cut down. Then, similarly to the pulses of the upper stage, the pulses of the lower stage are also cut down in the order of the light pulses 50'-5 to 50'-8. Then, the parallel signal light 50' arrives in the form of an output signal light 52 including the spatially cut-down eight pulses at the signal detecting portion 58 to be converted into an electric signal by a photodiode or a CCD device. At this time, since in the signal detecting portion 58, the signal pulses are respectively detected in the areas 1 to 8 which are independently obtained by planarly dividing the irradiation surface, the time characteristics of the unit of the signal detecting portion 58 can be greatly relaxed from time response having the form of pulse intervals (in this embodiment, the time interval can be made eightfold). That is to say, the signal light having a high repetitive frequency can be processed, and also can be detected with one control light.

As described above, according to this embodiment, the signal light as the serial signal can be converted into parallel plural outputs with the single control light. That is to say, the light distributing device as the invention disclosed in JP 11-015031 A can be operated in the communication wavelength band by using the carbon nanotube thin film.

Note that, in this embodiment, the description has been given of the mode in which the continuous eight pulses of the signal light are cut down in the planar form of 4×2 areas. However, if the number (m×n) of divided areas of the irradiation surface of the light control portion is further increased, the number of stages for delay of the control light by the light delay unit is increased from 2 to n, and the incident angle ? of the control light is adjusted so as to correspond to the number n of transversely divided areas of the irradiation surface of the light control portion, then a very large number of pulses (m×n) of the signal light can be processed with one pulse of the control light. This process is as disclosed in JP 11-015031 A.

(Verification Test of Function of Second Embodiment)

A (one-input multi-output type optical a switching system similar to that of the second embodiment was manufactured to confirm the operation of a very high speed absorption change, so that the function of the optical switching system of the second embodiment was verified. Note that, since the verification test concerned chiefly aimed at the function demonstration, no clock extraction was carried out, and two lights generated by optically separating a light from the same light source by a half mirror or the like were judged as a signal light and a control light (a pseudo signal light and a pseudo control light), respectively. This respect is the same as that (in the verification test of the function of the first embodiment). In addition, the carbon nanotube thin film having an absorption maximum at 1.3 μm and manufactured in the section <Characteristics of Carbon Nanotube Thin Film> was used as the CNT thin film 86. Further, the same light as the light 40 in (Verification Test of Function of First Embodiment) was used as the light 70.

Figure 9:
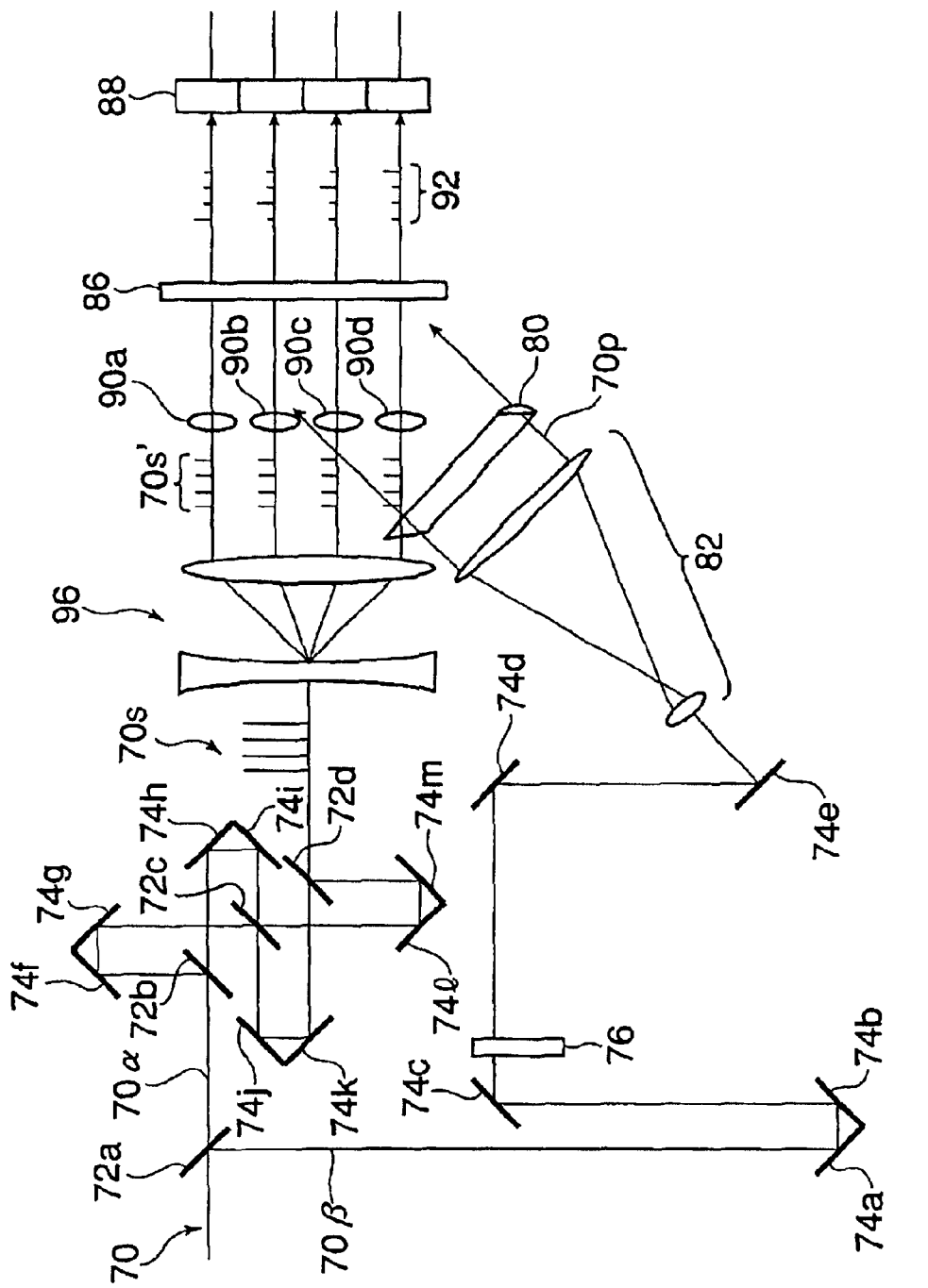
FIG. 9 is a schematically constructional view showing a one-input one-output type optical switching system for use in a verification test for the second embodiment.

FIG. 9 is a schematically constructional view showing the one-input multi-output type optical switching system used in this verification test. In FIG. 9, reference numeral 86 designates a CNT thin film as a light control portion; 88, an InGaAs photodiode array as a signal detecting unit; and 96, a lens as a parallelizing unit. Then, this system is constructed so that light pulses 70s judged as a signal light are controlled with a light pulse 70p judged as a control light. In actuality, half mirrors 72a to 72d, mirrors 74a to 74m, an ND filter 76 and the like are combined with one another for arrangement and thus, a light 70 from one light source is optically divided, and is adjusted with an intensity thereof, and also a timing is adjusted therefor to generate the pseudo signal light 70s and the pseudo control light 70p. While this embodiment adopts an example in which the continuous eight pulses are two-dimensionally, spatially separated, in this verification test, one-dimensional spatial separation was carried out to generate a train of continuous four light pulses.

First of all, the light 70 is optically divided into two parts by the half mirror 72a. One (70a) of the two parts obtained by optically dividing the light 70 was converted into a continuous four-pulse train corresponding to repetition of 1 THz to obtain the pseudo signal light 70s using plural retroreflectors (including the half mirrors 72b to 72d, and the mirrors 74f to 74m). A pulse interval is set to 1 ps corresponding to repetition of 1 THz.

In addition, the other (70β) obtained through the optical division was adjusted with quantity of light thereof by the ND filter 76 to obtain the pseudo control light 40p.

Note that, a ratio of distribution of light intensities when optically dividing the light 70 into two parts by the half mirror 72a is set so that the intensity of the light 70β as the pseudo control light 70p becomes 4 times as high as that of the light 70a as the pseudo signal light 70s.

The pseudo signal light 70s is enlarged by the lens (parallelizing unit) 96 to be spatially developed into parallel pseudo signal lights 70s' to be made incident perpendicularly on the CNT thin film 86. At this time, the parallel pseudo signal lights 70s' corresponding to four areas on the irradiation surface of the CNT thin film 86 which are obtained through the virtual division are respectively condensed by lens arrays 90a to 90d with a focal length of 120 mm so as to become four spot-like lights each having a diameter of 140 μm at intervals of 1 mm on the irradiation surface of the CNT thin film 86. Note that, the meaning of condensing of the signal light, preferred embodiments thereof, and the like are as described in (Verification Test of Function of First Embodiment).

The arrangement of the mirrors 74a to 74e was adjusted so that the pseudo control light 70p is made incident from a direction inclined with respect to the signal light by 17.5 degrees in synchronization with the pseudo signal light 70s. The pseudo control light 70p was condensed by a cylindrical lens 80 with 120 mm focal length so as to become a stripe-like light having a size of 150 μm×5 mm with the width set larger than the length on the irradiation surface of the CNT thin film 86. Note that, the meaning of condensing of the control light, preferred embodiments thereof, and the like are as described in (Verification Test of Function of First Embodiment).

Absorption in the CNT thin film 86 is decreased in a spot which is obtained in such a way that the irradiation surface of the CNT thin film 86 is irradiated with the stripe-like pseudo control light 70p. Then, this spot is moved on the irradiation surface of the CNT thin film 86 as the pseudo control light 70p travels. The irradiation spot of the pseudo control light 70p overlaps the irradiation spots of the pulses of the pseudo signal light 70s at different time points. Then, only the pulse of the pseudo signal light 70s in the irradiation spot at which those lights overlap each other is transmitted through the CNT thin film 86. As described above, since absorption in the CNT thin film 86 is very rapidly recovered, two or more continuous pulses cannot be transmitted through the same irradiation spot on the CNT thin film 86. Hence, the pulses of the pseudo signal light 70s are observed in spatially different positions to thereby carry out the light distribution. Note that, an angle formed between a travelling direction of the pseudo signal light 70s and a travelling direction of the pseudo control light 70p is set so that the pulses having intervals of 1 ps of the pseudo signal light 70s are spatially separated at pitches of 1 mm.

An output pseudo signal light 92 transmitted through the CNT thin film 86 was detected by an InGaAs photodiode array 88. The confirmation of the light distribution was carried out by observing a signal pattern of the output pseudo signal light 92 formed by blocking off a part of a retroreflector in the pseudo signal light 70s' in terms of a change in output of the InGaAs photodiode array 88.

As a result of the verification test, it was confirmed, from the fact that an output of the InGaAs photodiode array 88 in the position corresponding to the blocked-off area in the output pseudo signal 92 was changed, that a light pulse train of the pseudo signal light 70s' with a frequency equivalent to 1 THz frequency was spatially separated. Note that, in this verification test, a ratio in light intensity of the transmitted light of the synchronous signal pulse to the transmitted light of the asynchronous signal pulse was about 2/1 (synchronous signal pulse/asynchronous signal pulse) when an intensity of the pseudo control light 70p was 6.5 pJ/μm². In addition, a transmission loss of the pseudo signal light 40s was about 21 dB.

As set forth, while the optical switching system of the present invention has been described by giving the two embodiments, it is to be understood that the present invention is not intended to be limited thereto, and hence any of conventionally known constructions can be diverted and/or added as long as it includes the constitution of the present invention. In particular, the specific numerical values given in the above-mentioned two embodiments are all used for the sake of convenience for the purpose of explaining the constructions, and hence when embodying the present invention, those skilled in the art can freely design the optical switching system in accordance with the desired operation and effects.

Note that, the above-mentioned verification test is based on the basic construction chiefly aiming at the principle demonstration, and hence it may not be said that with the system characteristics obtained herein, both the S/N ratio and the throughput are sufficient. However, the improvements in the film quality of the carbon nanotube thin film and in the device form allow the performance to be enhanced (of course, even such improvements as to fall under the category of the findings based on the conventionally known knowledge allow the performance to be enhanced).

As set forth hereinabove, according to the present invention, it is possible to provide the optical switching system which is capable of being operated at a very high speed in the communication wavelength region at an extremely low cost, and also it is possible to adopt a novel construction based on the provision of a large area thin film material. Thus, the present invention greatly contributes to formation of a very high speed optical switching system in a communication wavelength region.

What is claimed is:

1. An optical switching system comprising:
    a light control portion irradiated with a signal light composed of a light pulse train;
    a control light applying unit that applies a pulse-like control light synchronized with the signal light to the light control portion to selectively transmit the light pulse train within the signal light to form an output signal light;
    a clock extracting unit that synchronizes the control light applied by the control light applying unit with the signal light; and
    a signal detecting unit that receives the output signal light,
    wherein the light control portion is composed of a thin film made of carbon nanotubes.

2. An optical switching system according to claim 1, wherein the signal light has a repetitive frequency on the order of $10^9$ to $10^{12}$ pulses/sec.

3. An optical switching system according to claim 1, wherein a repetitive frequency of the control light is equal to or lower than 1/10 of the repetitive frequency of the signal light.

4. An optical switching system according to claim 1, wherein any of the signal light and the control light is composed of a light pulse with a time width on the order of $10^{-12}$ to $10^{-15}$ sec.

5. An optical switching system according to claim 1, wherein the thin film contains a single wall carbon nanotube.

6. An optical switching system according to claim 1, wherein an absorption wavelength region of the thin film falls within the range of 1.2 to 1.6 $\mu$m.

7. An optical switching system according to claim 1, wherein the thin film contains a carbon nanotube a diameter of which is in the range of 0.8 to 1.3 nm.

8. An optical switching system according to claim 1, wherein the thin film is formed by spray-applying dispersion liquid in which a carbon nanotube is dispersed in a dispersion medium.

9. An optical switching system according to claim 8, wherein the dispersion medium is dimethylformamide.

10. An optical switching system according to claim 1, wherein a thickness of the thin film is in the range of 100 to 600 nm.

11. An optical switching system according to claim 1, wherein a first condensing unit that condenses the signal light to be applied to the light control portion on an irradiation surface of the light control portion is arranged in a path along which the signal light travels.

12. An optical switching system according to claim 11, wherein a diameter of a spot of the signal light condensed by the first condensing unit on the irradiation surface of the light control portion is in the range of 10 to 200 $\mu$m.

13. An optical switching system according to claim 1, wherein a second condensing unit that condenses the control light to be applied to the light control portion on an irradiation surface of the light control portion is arranged in a path along which the control light travels.

14. An optical switching system according to claim 13, wherein a diameter of a spot of the control light condensed by the second condensing unit on the irradiation surface of the light control portion is in the range of 10 to 200 $\mu$m.

15. An optical switching system according to claim 1, wherein the irradiation surface of the light control portion is divided into plural areas, and the respective plural areas obtained through the division are optically controlled independently and in parallel.

16. An optical switching system according to claim 15, further comprising a parallelizing unit that enlarges the signal light to be applied to the light control portion so as cover the entire plural areas obtained through the division and converts the resultant light into parallel signal lights,
    wherein the control light applied from the control light applying unit is applied to the light control portion so as to have such spreading within a surface perpendicular to a travelling direction as to cover the entire plural areas obtained through the division.

* * * * *